(12) United States Patent
Tucker

(10) Patent No.: US 11,366,501 B2
(45) Date of Patent: Jun. 21, 2022

(54) DISPLAY SYSTEM

(71) Applicant: Lenovo (Singapore) Pte. Ltd., Singapore (SG)

(72) Inventor: Matthew Ian Tucker, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/915,892

(22) Filed: Jun. 29, 2020

(65) Prior Publication Data
US 2021/0405716 A1   Dec. 30, 2021

(51) Int. Cl.
G06F 1/18 (2006.01)
F16M 13/00 (2006.01)
H02J 50/00 (2016.01)

(52) U.S. Cl.
CPC ........... *G06F 1/189* (2013.01); *F16M 13/005* (2013.01); *G06F 1/181* (2013.01); *H02J 50/005* (2020.01); *H02J 2310/20* (2020.01)

(58) Field of Classification Search
CPC ................................. G06F 1/16; G06F 1/1632
See application file for complete search history.

(56) References Cited

U.S. PATENT DOCUMENTS

| | | | |
|---|---|---|---|
| 9,879,900 B1* | 1/2018 | Ammerman | F25D 23/085 |
| 2004/0061996 A1* | 4/2004 | Kamphuis | G06F 1/1632 |
| | | | 361/679.41 |
| 2009/0154079 A1* | 6/2009 | Bae | A47B 21/00 |
| | | | 361/679.02 |

OTHER PUBLICATIONS

Kumar Ghosh, S., Nova Surface-Care Centre Pvt. Ltd., Anti-viral surface coating to prevent spread of novel Coronavirus (COVID-19) through touch, Coatings World, Apr. 15, 2020 (11 pages).
Newnex, USB Type-C Flat Cables, U4S4C01C01-010, U4S4C01C03-010, U4S4A01C11-010 (www.newnex.com/usb-c-flat-cable.php) accessed Jun. 29, 2020 (3 pages).

\* cited by examiner

*Primary Examiner* — Jerry Wu
(74) *Attorney, Agent, or Firm* — Brian J. Pangrle

(57) ABSTRACT

A system can include a display that includes a mount; a display stand that includes a base that includes opposing sides and a platform that spans the opposing sides, an arm that extends from the base and that operatively couples to the mount, and a video cable passage that includes a side opening on one of the opposing sides of the base; and a video cable that operatively couples to the display, that is disposable at least in part in the video cable passage, and that includes a connector exposable via the side opening of the one of the opposing sides of the base of the display stand.

17 Claims, 13 Drawing Sheets

DISPLAY SYSTEM

TECHNICAL FIELD

Subject matter disclosed herein generally relates to technology for computing systems.

BACKGROUND

Various types of display devices, display systems, computing systems with a display, etc., exist that can be utilized in various environments.

SUMMARY

A system can include a display that includes a mount; a display stand that includes a base that includes opposing sides and a platform that spans the opposing sides, an arm that extends from the base and that operatively couples to the mount, and a video cable passage that includes a side opening on one of the opposing sides of the base; and a video cable that operatively couples to the display, that is disposable at least in part in the video cable passage, and that includes a connector exposable via the side opening of the one of the opposing sides of the base of the display stand. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

Figure 1:
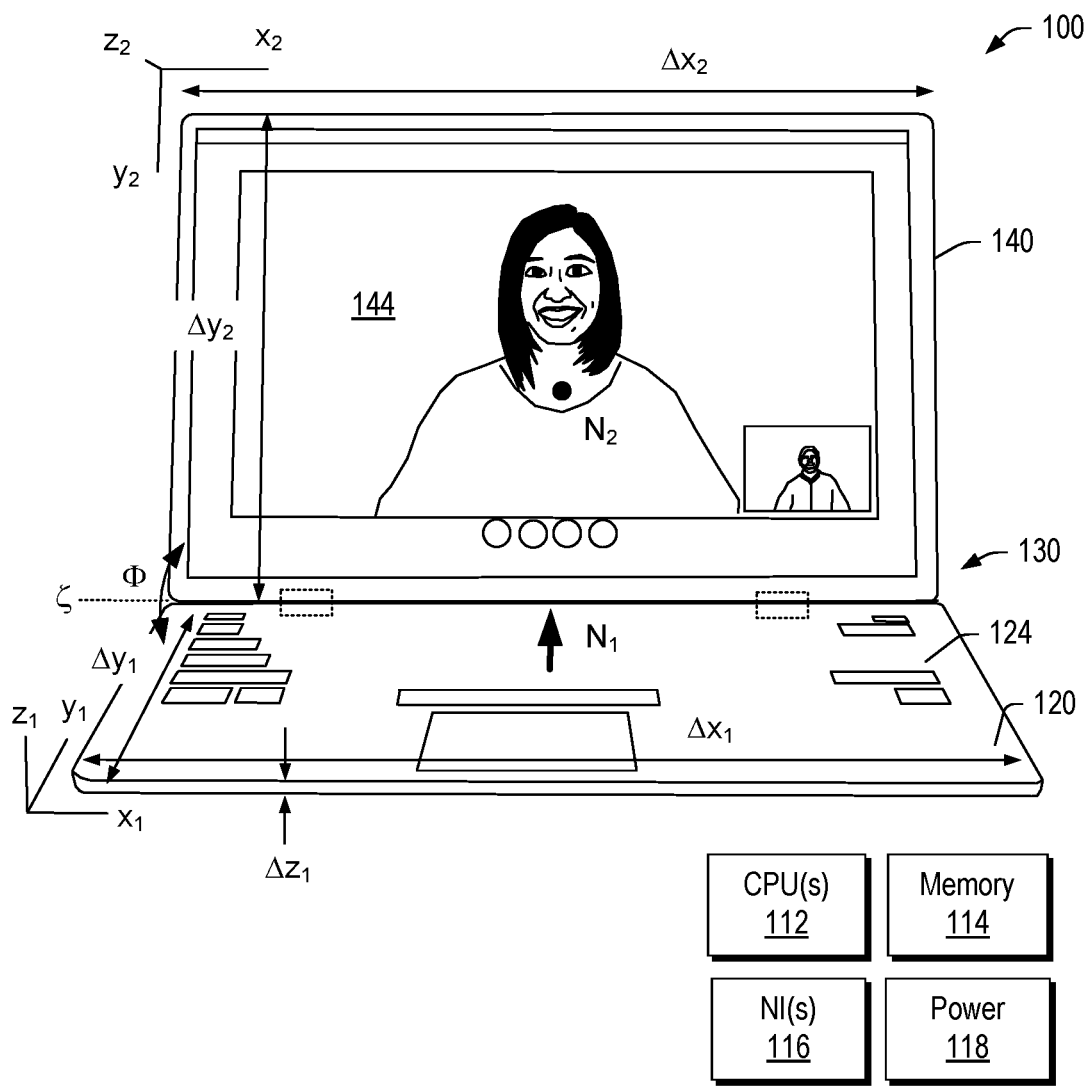
FIG. 1 is a perspective view of an example of a computing system.

FIG. 1 shows a perspective view of an example of a computing system 100 that includes a first housing 120 and a second housing 140 that are rotatably coupled via a hinge assembly 130. As shown, the first housing 120 can be a keyboard housing that includes a keyboard 124 and the second housing 140 can be a display housing that includes display circuitry and a display surface 144.

As an example, a display housing including display circuitry and a display surface may be referred to as a display or a monitor. A display may be a liquid crystal (LCD) display, a plasma display, a cathode-ray display, a light emitting diode (LED) display, or another type of display. Display circuitry can include one or more types of circuitry, which can include circuitry that can emit colored light, which may be direct and/or indirect (e.g., via backlighting, etc.). As an example, display circuitry can be operatively coupled to one or more processors where rendering of content to a display can be via one or more processor-based instructions.

As an example, the computing system 100 may include one or more processors 112, memory 114 (e.g., one or more memory devices), one or more network interfaces 116, and one or more power cells 118. Such components may be, for example, housed in one or more of the first housing 120 and the second housing 140.

In FIG. 1, various dimensions are shown with respect to a Cartesian coordinate system ($x_1$, $y_1$, $z_1$) for the first housing 120 and a Cartesian coordinate system ($x_2$, $y_2$, $z_2$) for the second housing 140. As shown, the axis $x_1$ can be utilized to define a width $\Delta x_1$, the axis $y_1$ can be utilized to define a depth $\Delta y_1$, and the axis $z_1$ can be utilized to define a thickness $\Delta z_1$. The dimensions $\Delta x_1$ and $\Delta y_1$ can define an area, for example, a footprint of the first housing 120 (e.g., $a_1 = \Delta x_1 * \Delta y_1$). As shown, the axis $x_2$ can be utilized to define a width $\Delta x_2$, the axis $y_2$ can be utilized to define a depth $\Delta y_2$, and the axis $z_2$ can be utilized to define a thickness $\Delta z_2$. The dimensions $\Delta x_2$ and $\Delta y_2$ can define an area, for example, a footprint of the second housing 140 (e.g., $a_2 = \Delta x_2 * \Delta y_2$). In the example of FIG. 1, the footprint of the first housing 120 can be approximately equal to the footprint of the second housing 140. In such an example, in a closed clamshell orientation, the second housing 140 can overlay the first housing 120 such that edges substantially align.

In the example of FIG. 1, the first housing 120 can define a plane where a normal vector $N_1$ can be defined as pointing outwardly from the keyboard 124 and the second housing 140 can define a plane where a normal vector $N_2$ can be defined as pointing outwardly from the display surface 144.

As shown in FIG. 1, the hinge assembly 130 can define an axis ξ where an angle Φ can be defined as an opening angle of the second housing 140 with respect to the first housing 120. The hinge assembly 130 can include one or more axles where the angle Φ may be adjustable from approximately 0 degrees (e.g., closed, $N_1$ directed against $N_2$) to approximately 180 degrees (e.g., flat, $N_1$ and $N_2$ being parallel and pointing in the same direction), optionally to approximately 360 degrees (e.g., a tablet orientation, $N_1$ and $N_2$ being parallel and pointing in opposite directions). As an example, the hinge assembly 130 can include one or more hinges.

As shown in FIG. 1, the computing system 100 can render content to the display surface 144 where the display surface 144 may be defined by a diagonal dimension. The computing system 100 can be a laptop or clamshell computing system where the display surface 144 has a diagonal dimension that is less than or equal to approximately 17 inches (e.g., approximately 43 cm). For example, a standard 17-inch display may be approximately 17.3 inches diagonally (e.g., approximately 44 cm). As an example, consider a 17-inch display laptop that has dimensions of 15.74 in ×11.42 in ×1 in (e.g., 400 mm×290 mm×25.4 mm) with a mass of 6.26 lb or more (e.g., 2.84 kg or more). In contrast, a 14-inch display laptop may have dimensions of 12.71 in×8.54 in ×0.59 in (e.g., 323 mm×217 mm×14.9 mm) with a mass of approximately 2.40 lb (e.g., 1.09 kg).

A laptop with a 17-inch display may be referred to as a full-size laptop or a desktop replacement. In other words, such a portable system may perform more like a tower or other PC that may generally be positioned on a floor, under a desk, etc. A laptop with a 17-inch display may be referred to as a big screen laptop or a giant laptop. As explained, such a laptop can be relatively heavy (e.g., greater than approximately 5 lb or 2 kg) and more difficult to carry than a smaller laptop. For example, a 14-inch display laptop may be less than approximately 3 lb or 1.5 kg. For various reasons, users can prefer smaller, lighter laptops as they can be easier to transport, take up less space, etc.

Types of users that may prefer a 17-inch display laptop over a 14-inch laptop include gamers that demand fast processors and graphics but that want a big-screen experience for easier gameplay; photographers and video professionals whose detailed work can demand large, high-performance displays in a system portable enough to carry to remote locations; home and family users who value a big, high-resolution screen, whether for video calling, watching movies, or playing games; business and home office users that want a full-featured desktop replacement PC that is still portable enough to take with them when needed; and power users for whom big laptops allow space for the special cooling and other features for modern number crunching, CAD drawing, video editing, etc.

As explained, compromises to accept for a big-screen laptop can include the laptop being heavier than a smaller model, the laptop not fitting into various laptop carrying cases, etc. Battery life can also be shorter than it would be with a smaller display size. Often, a big-screen laptop can be designed with visuals in mind, which may be achieved via use of memory, graphics chips, etc. Thus, using a big-screen laptop with an auxiliary display may not provide as great of a differential as using an auxiliary display with a smaller sized laptop.

In various instances, a larger display can improve usability. For example, eyestrain may decrease with increasing display size. Another distinguishing factor can be that larger laptops tend to include more ports and a wider variety of ports than a smaller laptop. For example, a 17-inch display laptop may include a USB-C port, three USB ports, a Mini DisplayPort port, an HDMI 2.0 port, an RJ45 port and an audio combo jack port; whereas, a 14-inch display laptop may include two USB-C ports (e.g., DisplayPort and data transfer), two USB ports, an HDMI 1.4 port, and an audio combo port. As the drive continues for more mobile, lighter laptops, the number of ports is likely to continue to decrease where, for example, port development includes multi-use ports such as the USB-C port with display capabilities.

As an example, a port can be a display port and a data port and/or power port. For example, consider DisplayPort over USB-C, where A/V display connection technology uses the versatile USB-C connector. Such a port can provide for DisplayPort audio/video (NV) performance (e.g., up to 8 k at 60 Hz), SuperSpeed USB (e.g., USB 3.1) data rates, up to approximately 100 watts of power over a single cable, reversible plug orientation and cable direction, backward compatibility to VGA, DVI, and HDMI with plug adapters or adapter cables, and adapter support for HDMI 2.0a and full 4K UHD resolution.

DisplayPort leverages the Alternate Mode Functional Extension of the USB-C interface, and shares similar electrical characteristics with USB 3.1, allowing use of common system elements. As mentioned, a port may provide for audio/video, SuperSpeed USB and power, on one connector. As an example, consider 4K @60 Hz 24-bit color (without compression) with simultaneous USB 3.1; 5K (5120×2880) display support without compression with simultaneous USB 2.0; support for BT.2020 color space, HDR, and HDCP 2.2; 8K×4K display support with use of 4:2:0 pixel structure or VESA Display Stream Compression; high-end multichannel audio support; backward compatibility with VGA, DVI, and HDMI 2.0 with CEC using plug adapters or adapter cables; and an extensible packet-based data structure.

As an example, a system can include one or more types of ports, which may include one or more of a THUNDERBOLT port, a LIGHTNING port, a DisplayPort port, a USB-C, an HDMI port, etc. As mentioned, a port may provide for at least video transmission and may provide for power transmission. As an example, video transmission may be from a computing system to a display and power transmission may be to the computing system. In such an example, the transmission directions can be characterized as being in opposite directions.

Computing system displays (e.g., monitors) were originally created as accessories for mainframe computing systems, workstation computing systems, or desktop computing systems. As explained, mobile computing systems, such as, for example, laptops that include an integral display, may be utilized for desktop types of use scenarios in addition to mobile types of use scenarios. As explained, a mobile computing system can include one or more ports capable of transmitting video. And, as a drive continues to reduce size and/or mass, number of ports can be expected to decrease along with an increase in port functionality. With fewer ports, a mobile computing device may be made smaller (e.g., thinner) and of lesser mass. Further, with miniaturization of circuitry, processors are becoming faster, smaller, more energy efficient, etc. As such, a modern small laptop can provide compute resources that match a less modern desktop PC. Portability will continue to be desirable, particularly as workers may work in multiple environments such as work and home where circumstances may demand more work from home while making scheduled or impromptu trips to a workplace. Additionally, work may be expected while in transit or in particular environments (e.g., airport, coffee shops, hotel, hospital, etc.). For example, a worker may be expected to stay in a hotel where the hotel may provide a display at a desk or positionable on or near a desk. Yet further, a worker may be expected to maintain cleanliness of a mobile computing system, which may involve the worker knowing where the mobile computing system is at nearly all times (e.g., knowing who might have touched or used the system).

As an example, a kiosk-like workstation may include a display with an associated stand. In such an example, the workstation may be expected to be used by one person at a time where, for example, over a period of a day or days, multiple, different people may utilize the workstation. To make the workstation easy to use and readily compatible with various types of user equipment, the stand can include a dedicated cable that a user can plug into a port of her mobile computing system.

In such an example, the dedicated cable can be an anti-viral cable, which may be achieved via one or more of material of construction and coating. For example, consider a coating that includes nano-capsules containing one or more disinfectants that are effective in inactivating one or more of bacteria, viruses, and spores. Such a coating may include heat-sensitive polymers that encapsulate and release the one or more disinfectants upon human contact. As another example, a dedicated cable may include one or more types of metals, metal alloys, metal oxides, etc. For example, consider one or more of zinc, copper, silver, iodide, gold, silica, etc. As to some other examples, consider materials such as ammonium cationic materials. While a dedicated cable may be an anti-viral cable, one or more other portions of a display, a stand, etc., may be anti-viral.

As an example, a display system that includes a display and a stand can include a dedicated cable that provides for usage with various types of mobile computing systems, particularly where one or several laptops is connected, used, and then removed, which may occur relatively frequently.

As an example, a display system can include a platform that provides for positioning of a mobile computing system. In such an example, the platform may make positioning of a mobile computing system convenient for connecting the mobile computing system to a display of the display system using a dedicated cable of the display system. In such an example, the platform may be sized and/or include features that are "anti-damage" such that undesirable contact is reduced, which may result in wear, scratching, etc., of a user's mobile computing system. As an example, a platform may provide for positioning a mobile computing system in a manner that helps to create or maintain a "clean" desktop, which may be of minimal clutter. In such an example, a user may be able to see items that the user has brought to a workstation such that upon leaving the user is at lesser risk of leaving one or more items behind, which, as mentioned, may be a source of discontent for a subsequent user as that subsequent user may not, for various reason, want to touch an item or items of another person (e.g., known or unknown).

Where a display system includes a dedicated cable, a user may be able to set-up equipment more expeditiously and may be able to get on the move more expeditiously as well. For example, a user may position his laptop on a platform of the display system, connect the dedicated cable to the laptop, use a display of the display system, and disconnect the dedicated cable from the laptop and leave. In such an example, the set-up process may take less than 30 seconds and the departure process may take less than 30 seconds. Further, the user may be able to perform such processes with minimal contact with one or more surfaces of the display system. For example, consider a power on and/or a power off of the display system using a sensor or sensors such that a user need not touch a power switch. As an example, a dedicated cable can be utilized as a sensor or can be operatively coupled to a sensor. For example, consider a capacitive touch sensor that can detect a user contacting an end connector of a dedicated cable. Such a sensor can be operatively coupled to logic circuitry that maintains power on while the end connector is electrically coupled to circuitry of a user's mobile computing system and, for example, where such electrical coupling terminates, the display system powers off.

As an example, a display system may include one or more light emitting diodes (LEDs). For example, consider a status LED, a guide LED, a disinfecting LED, etc. As to a status LED, it may indicate that power is on. As to a guide LED, it may guide a user to a location and/or use of a dedicated cable. As to a disinfecting LED, it may provide for disinfecting at least a portion of a dedicated cable. For example, consider a cable recess that is at least in part illuminated by a UV-C wavelength LED, which may be operable using a timer, a sensor, etc.

As to a dedicated cable, it can alleviate a need for a user to search for, handle, remember to take with, etc., a user's cable. Further, a user's cable may not provide for a pleasing, aesthetic experience as the color, shape, size, etc., of the user's cable may clash or otherwise distract from a pleasing, aesthetic experience provided by a dedicated cable (e.g., appropriate length, aesthetic shape, color, etc.). Cable clutter can be an aspect of aesthetics and where a single dedicated cable of an appropriate length is provided, it may provide for superior aesthetics compared to a hit-or-miss random experience of user cables. Superior aesthetics can improve ergonomics as a blend-in type of approach may help a user focus on displayed content.

While a display with a stand may be provided at a workstation (e.g., a desk, etc.) where the display includes a female port for a user supplied cable, the stand may be insufficiently sized, shaped, etc., to accommodate positioning of a user's mobile computing system. Further, the stand may include one or more corners that are hard and sharp, which may damage a surface of a user's mobile computing system upon contact.

As an example, a display system can include a dedicated region for positioning of a mobile computing system such as a laptop. As mentioned, a display system can include a base with a platform where at least a portion of the platform can be dedicated to positioning of a mobile computing system. In such an example, the portion or portions may allow for utilization of surrounding space. For example, a user may position a cell phone, a mouse, a stylus, a notebook, etc., on a desktop surface where such items are in clear view and within reach of the user. As an example, a display system may provide for expedited hook-up to a mobile computing system through use of a clearly visible and discernable region for positioning of the mobile computing system, which may also facilitate connecting the mobile computing system to a dedicated cable of the display system. As mentioned, a display system may be configured to be "friendly" and/or made of "friendly" material(s) that can help to reduce risk of damage to a user's mobile computing system.

As mentioned, a dedicated cable may be sufficiently sized in terms of length with respect to a region for positioning a mobile computing system. Such a length may be less than approximately 30 cm and may be less than approximately 15 cm, which can be in contrast to a user supplied cable that may be more than 30 cm in length, which can add to cable clutter. As an example, a dedicated cable can be shaped to be ergonomic and long-lasting. For example, a dedicated cable can be thicker than a generic USB cable. As an example, a dedicated cable may be formed with a polymeric material that is ergonomically shaped and/or surfaced. For example, a generic USB cable can be relatively flimsy with likely points of failure, particularly between a wired portion and an end connector. Many users have experienced failed USB cables where fraying occurs that causes electrical problems, etc. As an example, a dedicated cable of a display system can be robust and can be relatively short while being long enough to accommodate a mobile computing system disposed on a platform of the display system.

As an example, a display system can include a USB-C hub display and a base that provides a relatively flat surface that can support either an entire laptop or at least a back portion of a laptop in a stable position while the laptop is connected and being used with the display where the base includes an integrated or semi-permanent USB-C cable of a length such that there is minimal excess cable when the laptop is connected. Such a display system can offer a more optimized experience for users of laptops either in single-user scenarios or in "hotel-desk" setups where a desk and display are to be used by several people, each with their own laptop, throughout the day. Such a display system can conserve space on a desk, allowing the base and docked laptop to occupy a common or largely overlapping footprint area. Such a display system can help to prevent the disappearance of a USB-C cable as a result of someone needing it to charge their phone elsewhere, etc. As an example, a display system can include a base that includes a recess that can at least partially hide a USB-C cable and/or retain a free connector end when it is not in use, which can improve aesthetics.

As an example, a display system may be a dock for a mobile computing system, which can include a dedicated cable (e.g., a pigtail, etc.), where the display system may be suitable for use at a workstation, a desk, etc., that may serve a single user, multiple users, etc.

Figure 2:
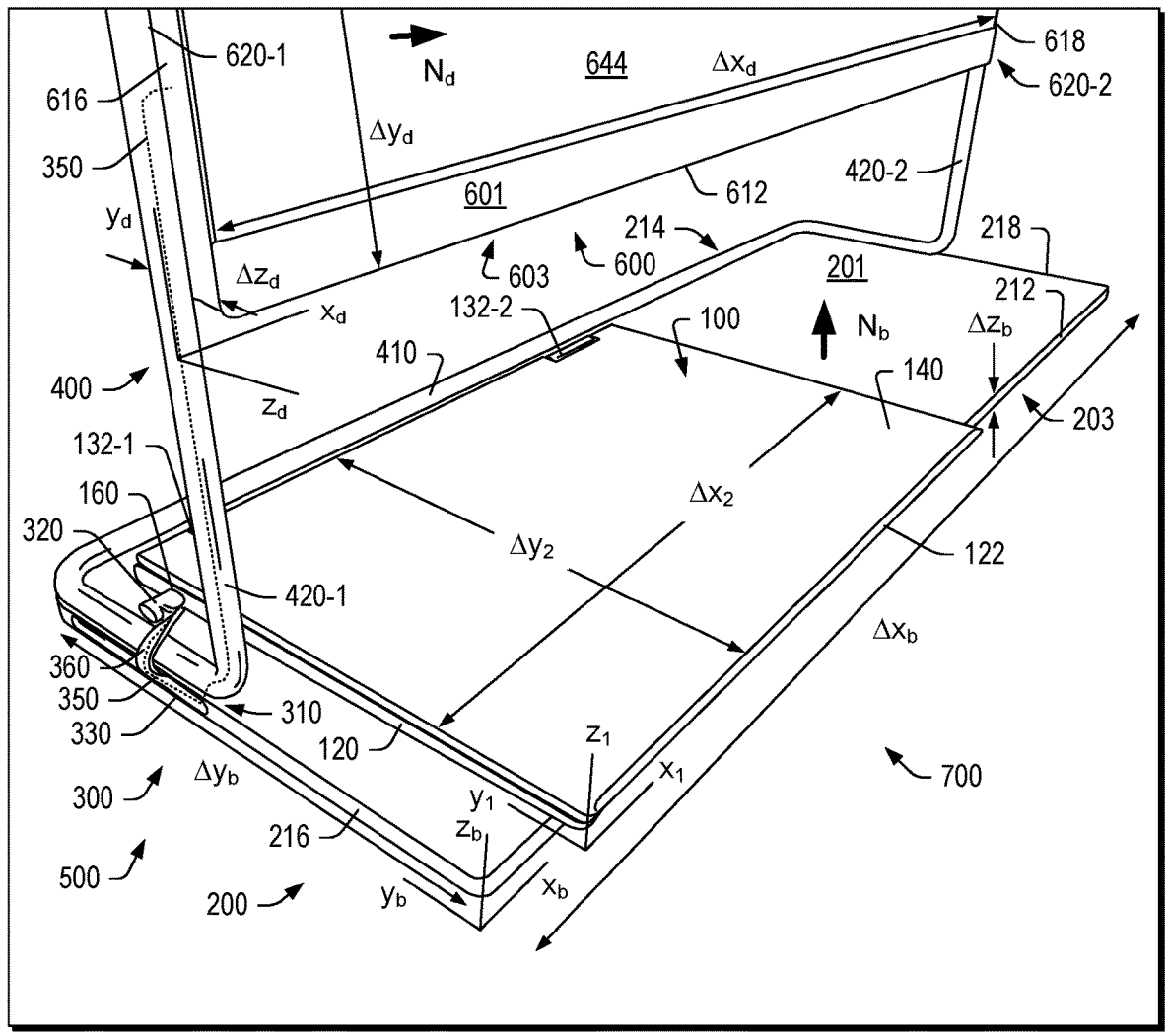
FIG. 2 is a perspective view of an example of a system.

FIG. 2 shows a perspective view of a portion of an example of a system 700 that includes a display 600 that includes one or more mounts 620-1 and 620-2; a display stand 500 that includes a base 200 that includes opposing sides 216 and 218 and a platform 201 that spans the opposing sides 216 and 218, one or more arms 420-1 and 420-2 that extend from the base 200 and that operatively couple to the one or more mounts 620-1 and 620-2, and a video cable passage 310 that includes a side opening 330 on one of the opposing sides of the base 200; and a video cable 350 that operatively couples to the display 600, that is disposable at least in part in the video cable passage 310, and that includes a connector 320 exposable via the side opening 330 of the one of the opposing sides of the base 200 of the display stand 500.

As an example, a display may include a mount or mounts. For example, consider a Flat Display Mounting Interface (FDMI) (e.g., a VESA Mounting Interface Standard (MIS)), which may be referred to as a VESA mount (e.g., a family of standards defined by the Video Electronics Standards Association for mounting flat panel monitors, televisions, and other displays to stands or wall mounts). For example, a display may include a back side FDMI that can be coupled to an arm of a display stand.

In the example of FIG. 2, the video cable passage 310, the connector 320, the side opening 330, the video cable 350, and a pigtail portion 360 of the video cable 350 can be part of a display connection sub-system 300, which can run in and/or on one or more components of the display stand 500.

In the example of FIG. 2, the arms 420-1 and 420-2 can be part of an arm sub-system 400 of the display stand 500 where the arm sub-system 400 can be utilized to operatively couple the display 600 and the base 200 of the display stand 500.

As an example, the display 600 may be a dedicated display that is supplied with the display stand 500, for example, to form the system 700. For example, the system 700 can the display stand 500, which includes the base 200, the display connection sub-system 300 and the arm sub-system 400, and the system 700 can include the display 600.

As shown in the example of FIG. 2, the computing system 100 is disposed on the platform 201 where the connector 320 is connected to a port 160 of the computing system 100. In the example of FIG. 2, the computing system 100 includes a left side hinge assembly 132-1 and a right side hinge assembly 132-2 where the computing system 100 is in a closed clamshell orientation. As shown, the computing system 100 is positioned on the platform 201 with the port 160 proximate to the side opening 330 such that the video cable 350 can reach the port 160 and the connector 320 can be connected to the computing system 100 via insertion of the connector 320 into the port 160.

In the example of FIG. 2, the base 200 can include a front edge 212 and a back edge 214 where the front edge 212, the back edge 214 and the opposing sides 216 and 218 can define the platform 201, which can be substantially rectangular in shape. As shown, a Cartesian coordinate system ($x_b$, $y_b$, $z_b$) can be utilized to define various dimensions and features of the base 200. For example, the base 200 can include a width $\Delta x_b$, a depth $\Delta y_b$ and a thickness $\Delta z_b$ and the platform 201 of the base 200 can include an outward normal $N_b$. In the example of FIG. 2, the depth $\Delta y_b$ is less than the depth $\Delta y_1$ and the depth $\Delta y_2$ of the computing system 100 such that a front edge 122 of the first housing 120 of the computing system 100 extends past the front edge 212 of the base 200. As shown, the base 200 can include a raised feature 410 at or proximate to the back edge 214 of the base 200. In such an example, the raised feature 410 (e.g., a bar, a ridge, etc.) may guide positioning of the computing system 100 such that the port 160 is positioned proximate to the video cable 350 (e.g., the side opening 330). For example, the raised feature 410 can be a stop that limits how far back the computing system 100 can be positioned on the platform 201.

As shown in FIG. 2, a Cartesian coordinate system ($x_d$, $y_d$, $z_d$) can be utilized to define various dimensions and features of the display 600. For example, the display 600 can include a width $\Delta x_d$, a height $\Delta y_d$ and a thickness $\Delta z_d$ where a display surface 644 of the display 600 can include an outward normal $N_d$. As shown, the display 600 includes a front side 601 and a back side 603 where the display surface 644 is on the front side 601. As an example, the display surface 644 may be disposed at an angle with respect to the platform 201, which may be a fixed angle or an adjustable angle. For example, the outward normal $N_d$ may be fixed or may be adjustable for purposes of viewing. As an example, the display surface 644 may be at a fixed height or an adjustable height from the platform 201. For example, a bottom edge 612 of the display 600 may be raised or lowered to be further from the platform 201 or closer to the platform 201, respectively. As an example, the clearance may be sufficient to transition the computing system 100 from a closed clamshell orientation to an open clamshell orientation where, for example, the opening angle may be sufficient for reaching a power button that may be disposed on the first housing 120 of the computing system 100 (e.g., above a keyboard, etc.).

In the example of FIG. 2, three Cartesian coordinate systems are shown, noting that more may be utilized for describing various features, positions, relationships, etc. For example, the platform 201 of the base 200 is directly beneath the bottom edge 612 of the display 600, which may provide for additional stability of the display 600 when the computing system 100 is disposed on the platform 201. In such an example, the system 700 can become more stable when in use (e.g., less likely to shift, tilt, etc.). Where the base 200 is positionable on a support surface (e.g., a desktop, a tabletop, a countertop, etc.), it may be positioned with the computing system 100 on the platform 201 or not. In the example of FIG. 2, if the base 200 is desired to be shifted on a support surface, a user may do so without the computing system 100 touching the support surface as it is elevated above the support surface by being positioned on the platform 201. For example, consider a user grabbing the arms 420-1 and 420-2 to adjust a position of the base 200, which may include sliding the base 200 on a support surface (e.g., to move it backward, forward, to the left, to the right, etc.). In such an example, the base 200 and the computing system 100 can move as a unit where there is minimal risk of the connector 320 becoming disconnected from the port 160 of the computing system 100. And, as extendibility of the video cable 350 from the side opening 330 via the pigtail portion 360 can be limited, there may be little risk of the video cable 350 getting caught during positioning or re-positioning of the base 200.

As mentioned, the base 200 can include the raised feature 410. In the example of FIG. 2, the raised feature 410 is shown as being a portion of a tube that defines a back extent of the platform 201 where the tube is bent to form corners such that the tube extends forward along the side 216 of the base 200 and along the side 218 of the base 200. The tube is then bent in an upward direction away from the base 200 to form the arms 420-1 and 420-2, which can be operatively coupled to the display 600, for example, via corresponding mounts 620-1 and 620-2 on opposing sides 616 and 618 of the display 600, respectively. In such an example, the mounts 620-1 and 620-2 may include slots, holes, pegs, etc., that provide for securing the display 600 to the arms 420-1 and 420-2 and, for example, angular adjustment and/or height adjustment of the display surface 644 of the display 600. As an example, a clearance can exist between the bottom edge 612 of the display 600 and the platform 201, where the clearance may be, for example, defined in a direction parallel to the $z_b$ axis. As mentioned, the height of the display 600 may be adjustable where an adjustment in the height may increase or decrease the clearance. As mentioned, the base 200 may be adjustable on a support surface via a user grasping one or both of the arms 420-1 and 420-2, which may be grasped without disturbing a position of the computing system 100 on the platform 201.

Figure 3:
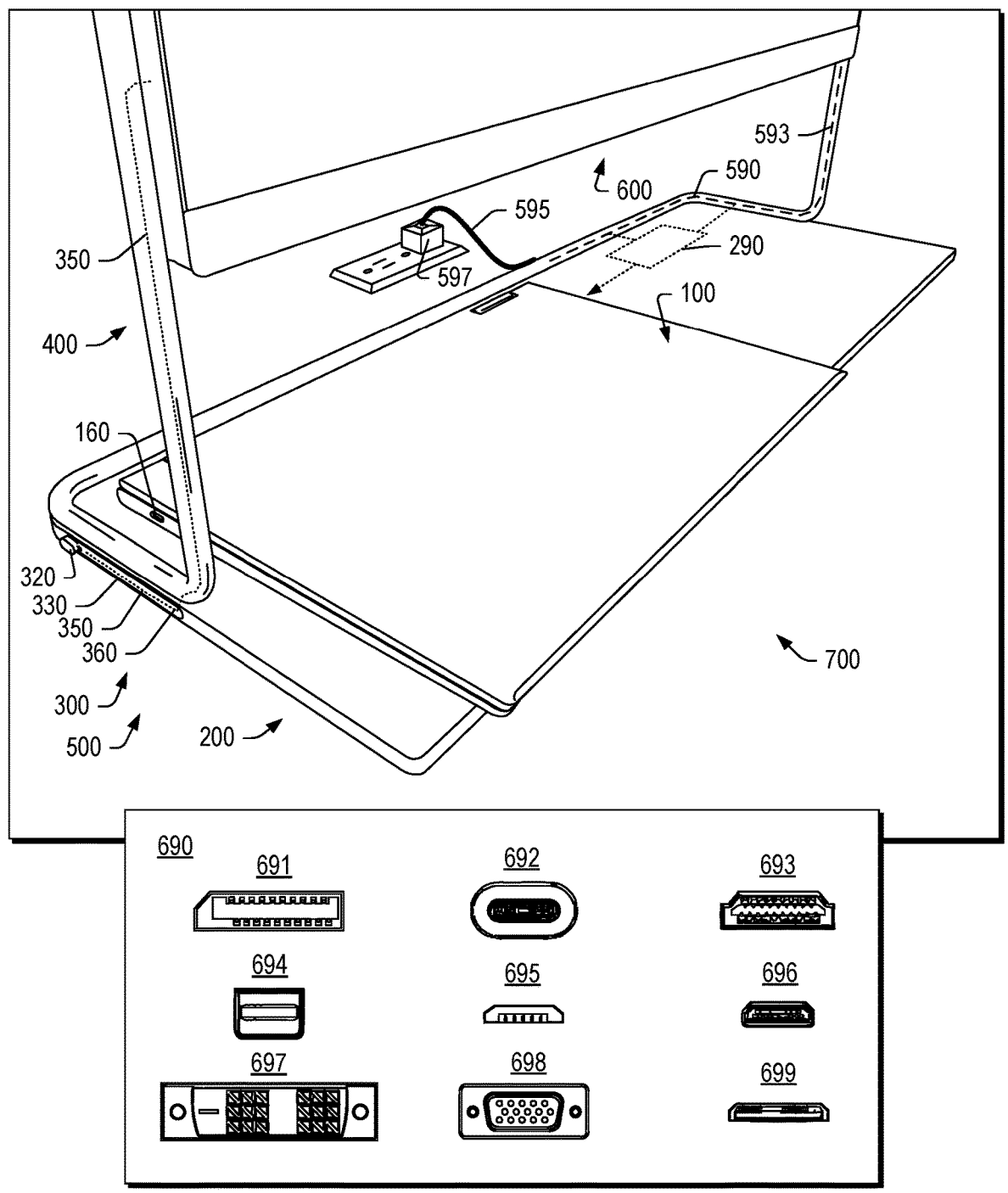
FIG. 3 is a perspective view of an example of the system of FIG. 2 and a series of diagrams of some examples of types of connectors.

FIG. 3 shows a perspective view of a portion of an example of the system 700 where the video cable 350 includes the pigtail portion 360 removably received in the side opening 330, which can be a side opening recess (e.g., a stored orientation of the pigtail 360 and/or the connector 320). As shown, the side opening 330 can be shaped and sized to accommodate the connector 320 and the pigtail portion 360 where either or both of which may include a grip feature or grip features that can be utilized to facilitate manual extraction of the connector 320 and the pigtail portion 360.

FIG. 3 also shows some examples of types of connectors 690, which can utilize one or more types of connection technologies. As shown, a connector can be a DisplayPort connector 691, a USB-C connector 692, a HDMI connector 693, a mini-DisplayPort connector 694, a USB micro-B connector 695, a micro-HDMI connector 696, a DVI connector 697, a VGA connector 698, a mini-HDMI connector 699, or another type of connector. As an example, the system 700 can include one or more converters, adapters, etc. For example, the display 600 may include one type of connector where an adapter transitions to a different type of connector. As an example, an adapter or adapters may be part of the display stand 500, for example, disposed within or on the base 200. As an example, the pigtail portion 360 may be coupled to an adapter, a converter, etc., such that the video cable 350 includes the connector 320 of the pigtail portion 360 and a different type of connector for connecting to the display 600. As an example, the display 600 can include one or more types of ports, which can be referred to as connection ports, connectors, etc. Where one end of the video cable 350 differs from another end of the video cable 350, the video cable 350 may be referred to as being heterogeneous; whereas, if the ends are the same, the video cable 350 may be referred to as being homogeneous. As an example, a video cable 350 can include one or more converters, one or more adapters, etc., which may provide compatibility for heterogeneity.

In the example of FIG. 3, the display stand 500 include a power cable passage 590 with a power cable 593 that can include a power cable pigtail 595 with a power cable connector 597, which can be a standard power plug for a power outlet. As an example, the display stand 500 can include one or more adapters, converters, etc., for converting power supplied via a power outlet to a power suitable for powering one or more types of circuitry of the display 600, of the computing system 100, etc. As an example, the video cable 350 may supply power to the computing system 100 when the connector 320 is plugged into the port 160 of the computing system 100. As an example, a separate computing system power cable may be included and/or a dual-headed pigtail may be provided that can transmit power via one connector and that can transmit video via another connector.

As mentioned, video transmission may be from a computing system to a display and power transmission may be to the computing system. In such an example, the transmission directions can be characterized as being in opposite directions. As an example, a display stand and/or a display can include a power connection that can supply power to a computing system. As an example, a system can include a hub that can direct and/or convert power from a power outlet to a pigtail that includes a connector that can supply power to a computing system via a port of the computing system. As an example, a system can include a power hub that can supply power to a display where the display may supply power to a USB-C type of connector where an end of a cable can be connected to the connector to supply power to a computing system via another end of the cable. In such an example, a user may position a computing system on a platform and connect a dedicated cable to a port of the computing system where the computing system is supplied with power via the dedicated cable and/or can transmit at least video to a display via the dedicated cable.

As an example, a system can include a power unit that can receive power via a cord that can plug into a power outlet. In such an example, the power unit can include one or more connectors. For example, consider a connector to supply power to a display and a connector to supply power to a pigtail of a cable that includes a connector that can be connected to a computing system to supply power to the computing system.

In the example of FIG. 3, circuitry 290 can include power circuitry that can receive power via the cable 595 and that can supply power to one or more of the display 600 and the connector 320 of the pigtail 360. As mentioned, a display may be configured with circuitry to supply power via a port where the port may be a port that can receive at least video. As an example, a cable may include multiple cables that are joined (e.g., at heads, along the cables, etc.). In such an example, one of the cables may carry at least video and another one of the cables may carry power.

Figure 4:
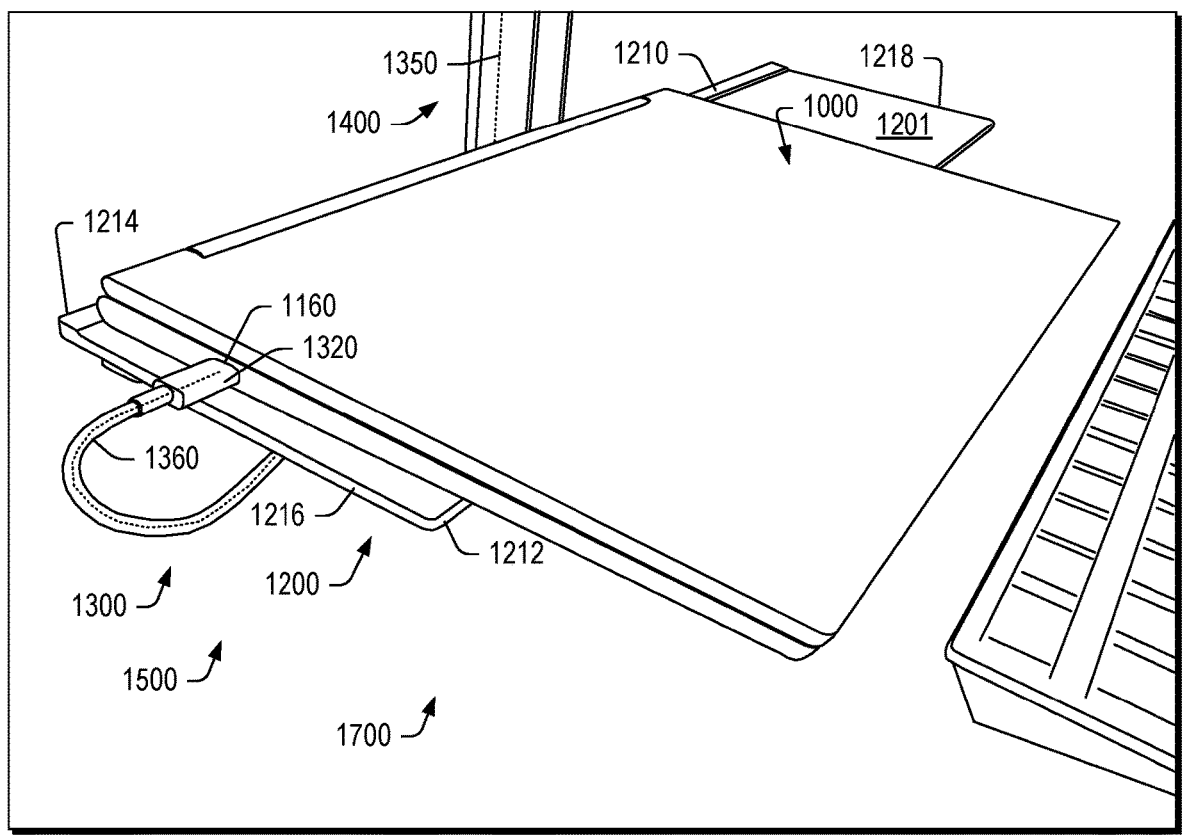
FIG. 4 is a perspective view of an example of a system.

FIG. 4 shows a perspective view of an example system 1700 that includes a display stand 1500 that includes a base

1200, a display connection sub-system 1300 and an arm 1400 that can be coupled to the base 1200 and coupled to a mount of a display. FIG. 4 further shows a computing system 1000 with a port 1160 where a connector 1320 of a pigtail 1360 of a video cable 1350 is removably received in the port 1160. As shown, the base 1200 includes a platform 1201 with a front edge 1212, a back edge 1214 and opposing sides 1216 and 1218, where the base 1200 can include a raised feature 1210, which may facilitate adequate positioning of the computing system 1000 on the platform 1201. As explained with respect to the base 200, one or more features can help guide a user to adequately position a computing system such that a port of the computing system is proximate to a connector of a video cable.

Figure 5:
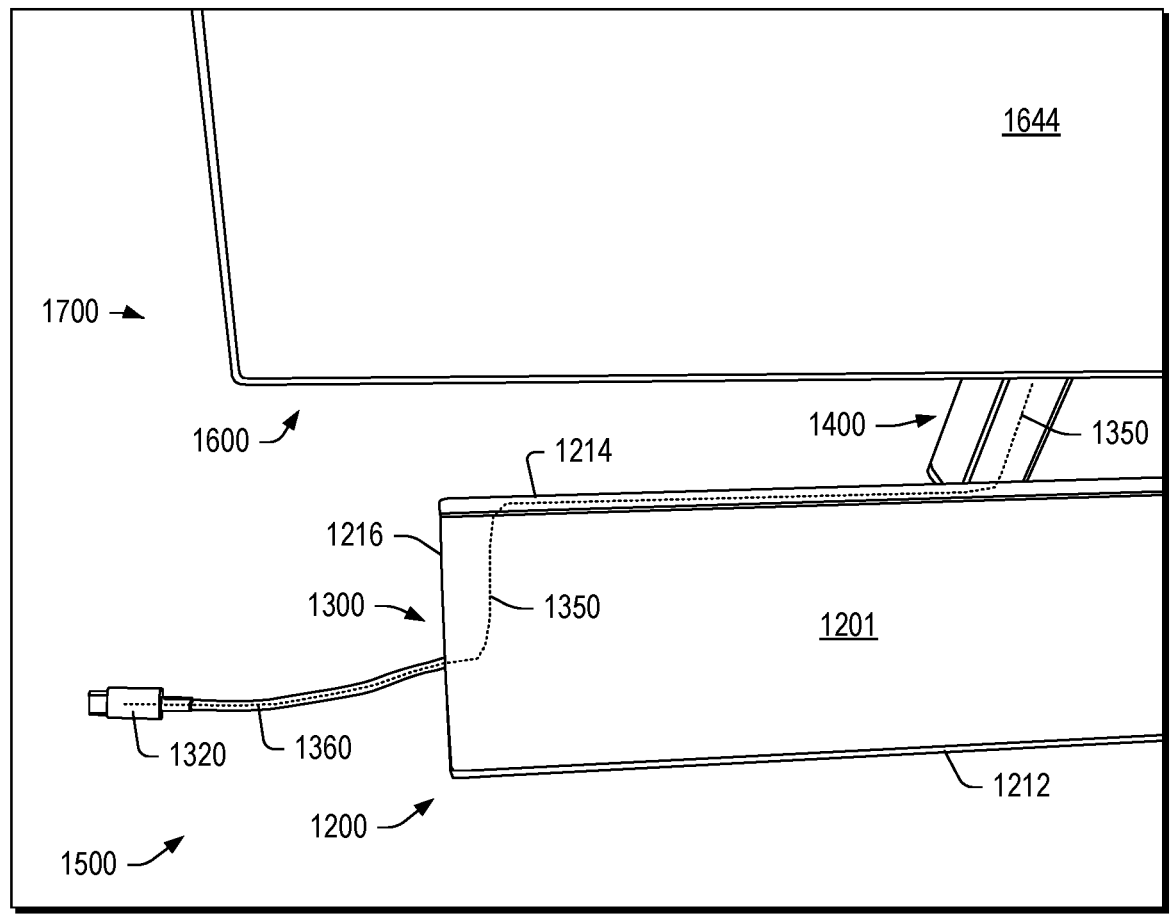
FIG. 5 is a perspective view of the system of FIG. 4.

FIG. 5 shows a perspective view of the system 1700 without the computing system 1000 positioned on the platform 1201. As shown, the video cable 1350 can be disposed in a video cable passage that can run through the arm 1400 to be operatively coupled to a display 1600, which includes a display surface 1644.

Figure 6:
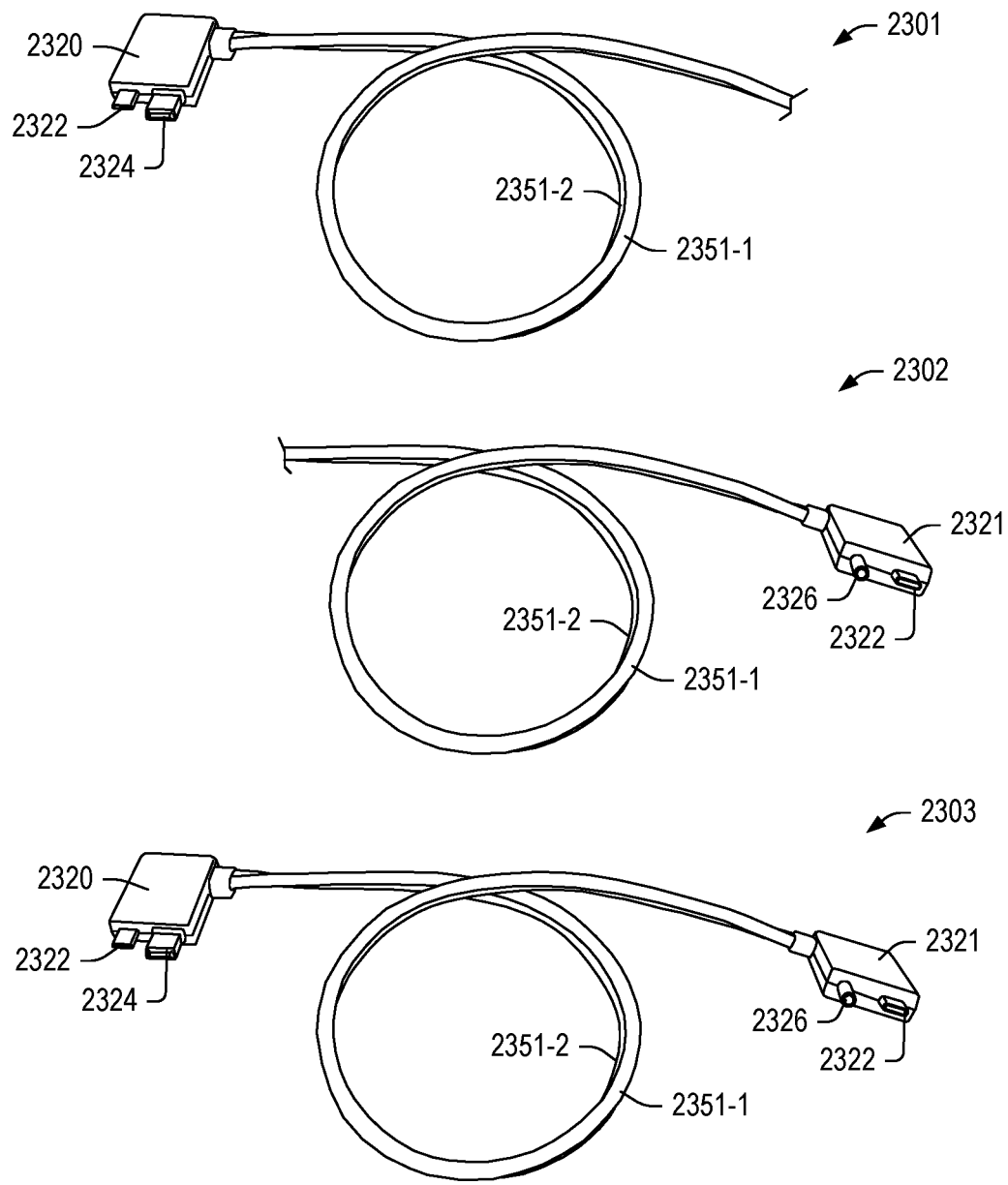
FIG. 6 is a series of perspective views of some examples of cables, connectors, and ports.
Figure 6:
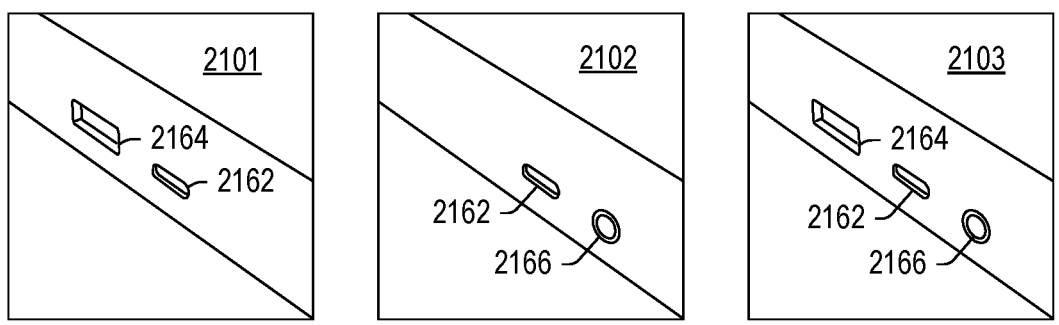

FIG. 6 shows a series of perspective views of some examples of cables, connectors and ports. As shown, a cable 2301, 2302 or 2303 can be a composite cable that can include two different cables 2351-1 and 2351-2 that are joined. As shown, a cable can include one or two connector heads 2320, 2321 or 2320 and 2321. As an example, a connector head can include one or more types of connectors 2322, 2324, and/or 2326. As an example, the cable 2301 can be a pigtail, the cable 2302 can be a pigtail and the cable 2303 can be a pigtail where, for example, one of the connector heads 2320 and 2321 may be coupled to a display stand, which may be an internal coupling (e.g., one of the connector heads 2320 and 2321 being disposed within a base, etc.) and/or a coupled to a display (e.g., exposed externally, disposed internally, etc.).

As to the example ports, a computing system 2101 may include multiple ports 2162 and 2164 that can be connected with the connectors 2322 and 2324, respectively, a computing system 2102 can include multiple ports 2162 and 2166 that can be connected with the connectors 2322 and 2326, respectively, and a computing system 2103 can include multiple ports 2162, 2164 and 2166 that can be connected with either the connectors 2322 and 2324 or the connectors 2322 and 2326.

As an example, a cable can include multiple cables and may be referred to as a split cable. For example, consider a THUNDERBOLT 3 workstation dock split cable that can include a power cable and a THUNDERBOLT 3 cable. In such an example, the power cable may be homogeneous or heterogeneous with respect to ends and the THUNDERBOLT 3 cable may be homogeneous with respect to ends.

THUNDERBOLT 1 and 2 can use a mini DisplayPort (MDP) connector and THUNDERBOLT 3 can use a USB-C connector. THUNDERBOLT technology can combine PCI Express (PCIe) and DisplayPort (DP) into two serial signals and can additionally provide DC power in a single cable. As an example, multiple peripherals may be supported by one connector through various topologies. As an example, a cable may include a THUNDERBOLT type of connector and cable and a separate power connector and cable. Or, for example, a cable may provide for video and power via a single THUNDERBOLT type of connector and cable. As mentioned, a cable may provide for transmission of video in one direction and transmission of power in another direction.

Figure 7:
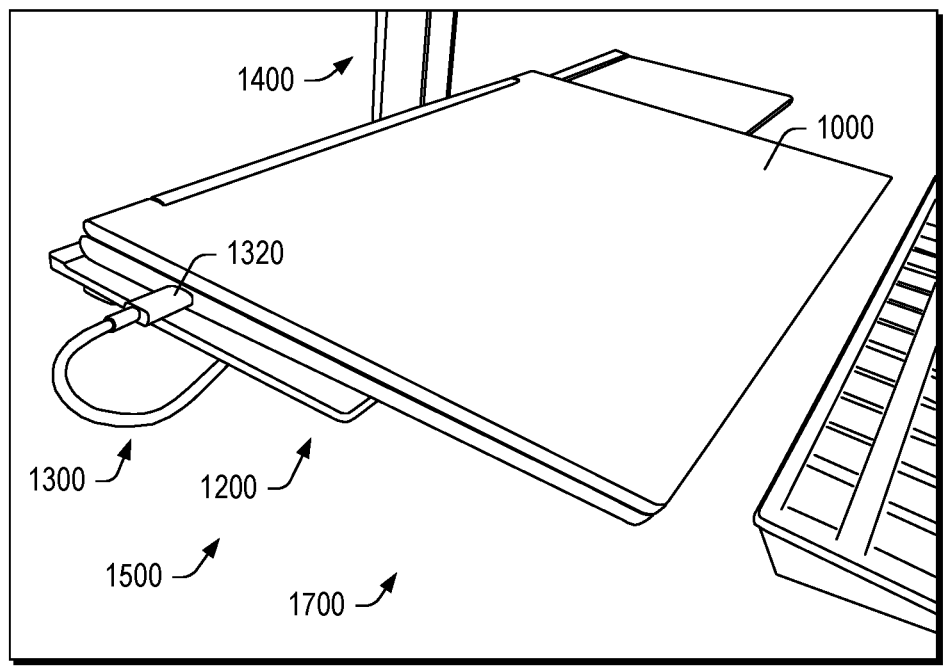
FIG. 7 is a series of perspective view of the system of FIG. 4.
Figure 7:
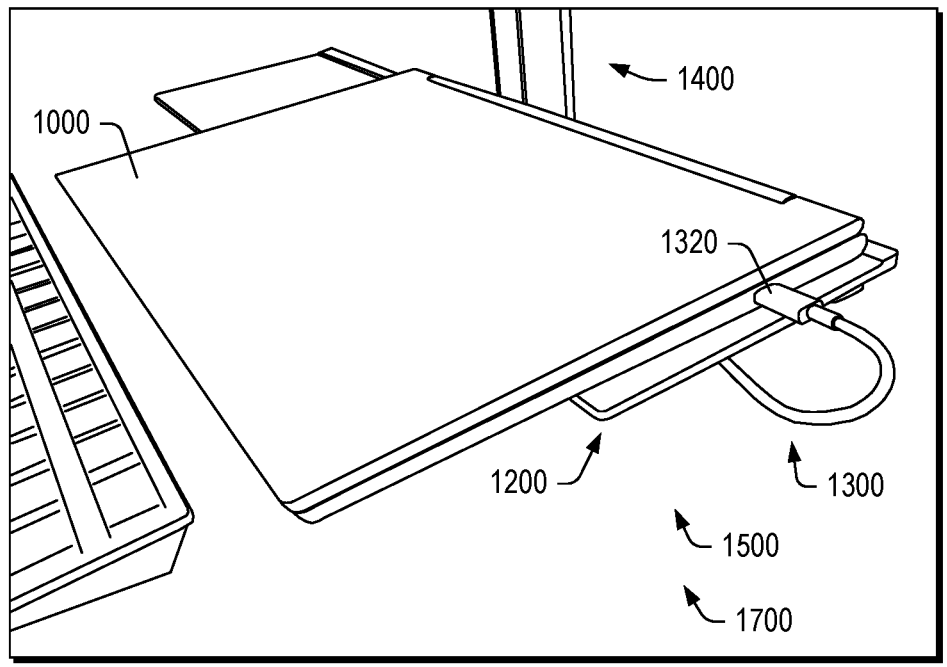

FIG. 7 shows a series of perspective views of the example system 1700 of FIG. 5 with the example computing system 1000. As shown, the system 1700 may be configured for a left hand side orientation or a right hand side orientation where, for example, the computing system 1000 includes the port or ports on the left hand side or on the right hand side. As an example, the base 1200 can include multiple instances of one or more features of the connection sub-system 1300. For example, consider a left hand side pigtail with a connector and a right hand side pigtail with a connector. As explained, a base may include a recess that can removably receive a connector and/or a pigtail (see, e.g., FIG. 2 and FIG. 3). In such an example, a user may know what side of a computing system has a port to be utilized for at least video and position the computing system appropriately such that the port is proximate to an appropriate connector and pigtail.

Figure 8:
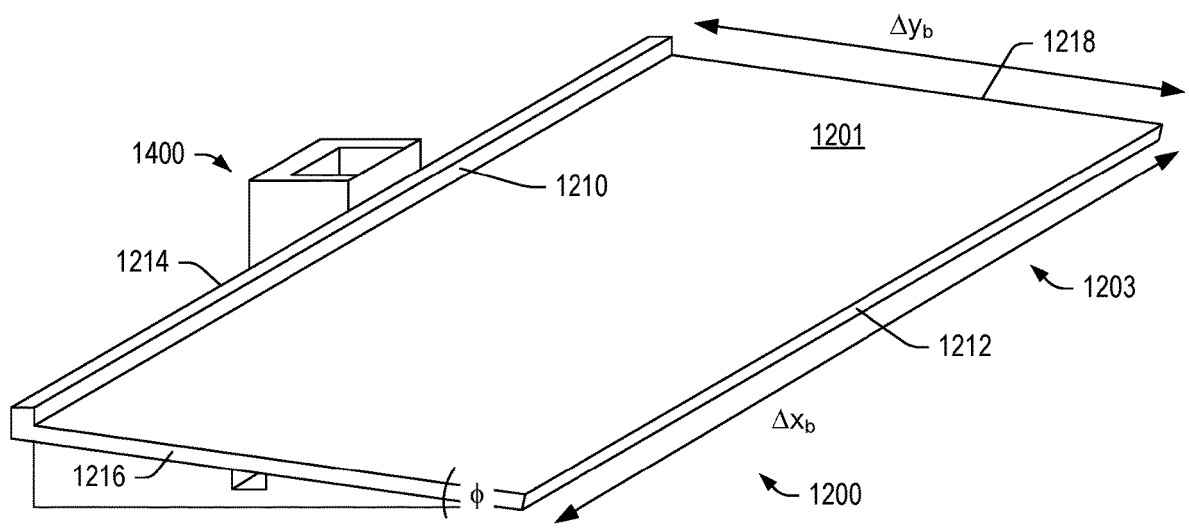
FIG. 8 is a perspective view of an example of a base of an example of a system.

FIG. 8 shows a perspective view of a portion of the display stand 1500, which includes the base 1200 and a portion of the arm 1400. In the example of FIG. 8, the platform 1201 is disposed at an angle φ such that the front edge 1212 is at a lower height than the back edge 1214.

Figure 9:
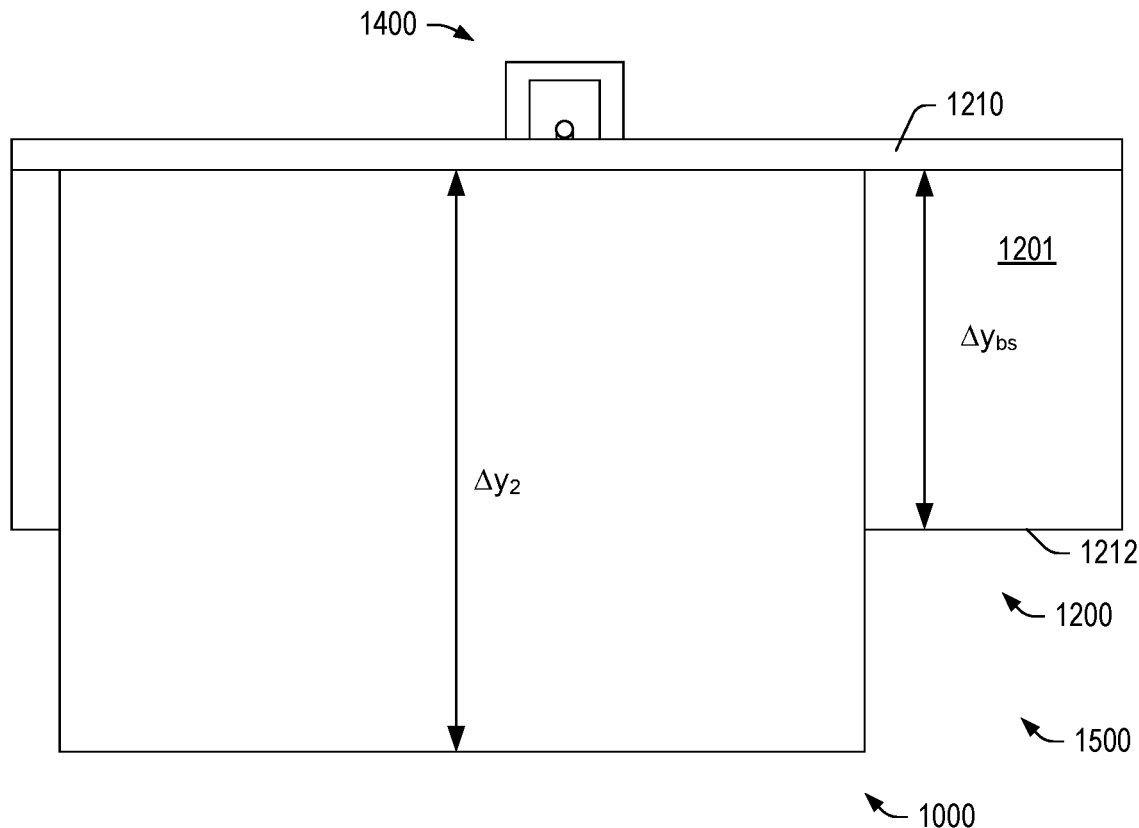
FIG. 9 is a plan view and a side view of an example of a display stand and a computing system.
Figure 9:
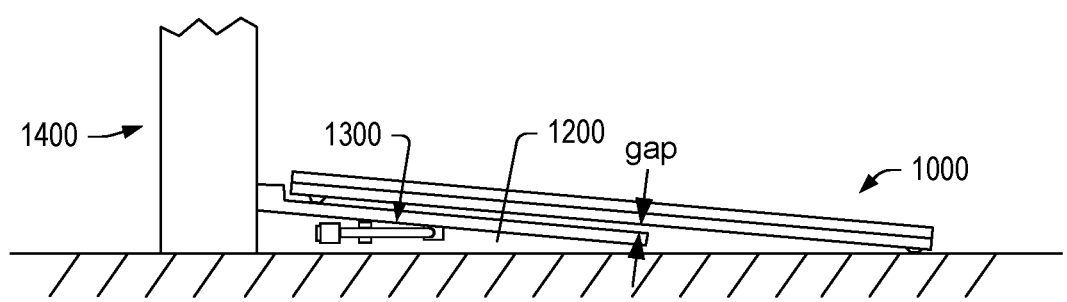

FIG. 9 shows a plan view of the portion of the display stand 1500 of FIG. 8 and a side view of the portion of the display stand 1500 of FIG. 8 where the computing system 1000 is positioned with respect to the platform 1201. As shown, the platform 1201 includes a depth $\Delta y_{bs}$ from a front side of the raised feature 1210 (e.g., a ridge) to the front edge 1212 that is less than the depth $\Delta y_2$ of the computing system 1000. As explained with respect to FIG. 8, the platform 1201 is disposed at an angle φ and, as shown in the side view of FIG. 9, a gap is defined between a lower surface of the computing system 1000 (e.g., a bottom surface of a keyboard housing) and the platform 1201. In particular, the lower surface of the computing system 1000 does not contact the front edge 1212 of the base 1200. In such an example, the gap can help to avoid contact, which may cause wear to the computing system 1000. Additionally, the gap may facilitate air flow to help in cooling of the computing system 1000.

Figure 10:
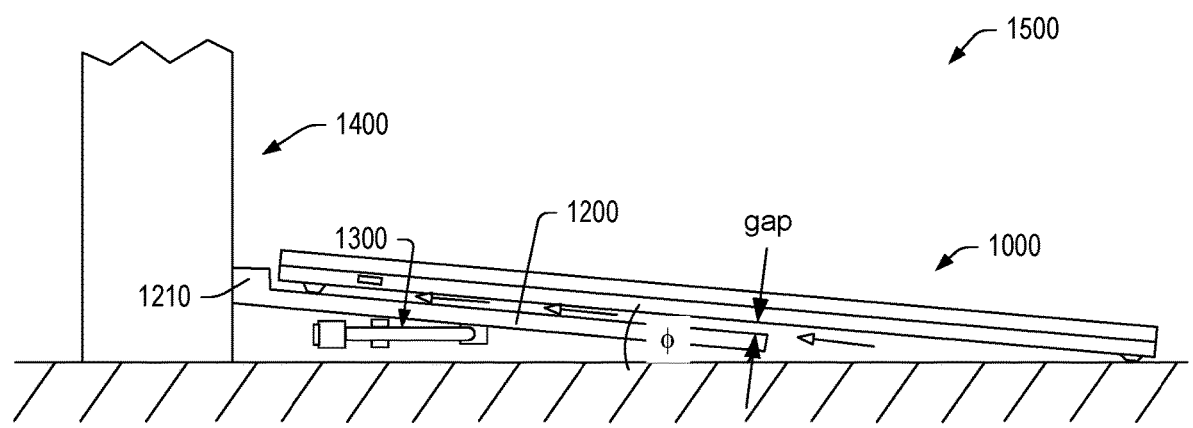
FIG. 10 is a side view of the display stand and the computing system of FIG. 9.

FIG. 10 shows the side view of FIG. 9 along with arrows that indicate examples of air flow, which may be aided by buoyancy, where hotter air is less dense and hence rises. In such an example, some amount of cooling can be via natural convection via air flow along a lower surface of a computing system.

FIG. 10 also shows the computing system 1000 as including feet where back feet can be of a greater height than front feet. For example, consider 3 mm high feet in the back and 2 mm high feet in the front. Such a difference may facilitate air flow aided by buoyancy. As shown, where the platform 1201 is at an angle φ the angle may be increased beyond that provided by the feet. As an example, the angle φ may be in a range of greater than 0 and less than 20 degrees. In such an example, the computing system 1000 may be supported by front feet such that a front edge of the computing system 1000 is not in contact with a support surface (e.g., a desktop, a tabletop, a countertop, etc.).

Figure 11:
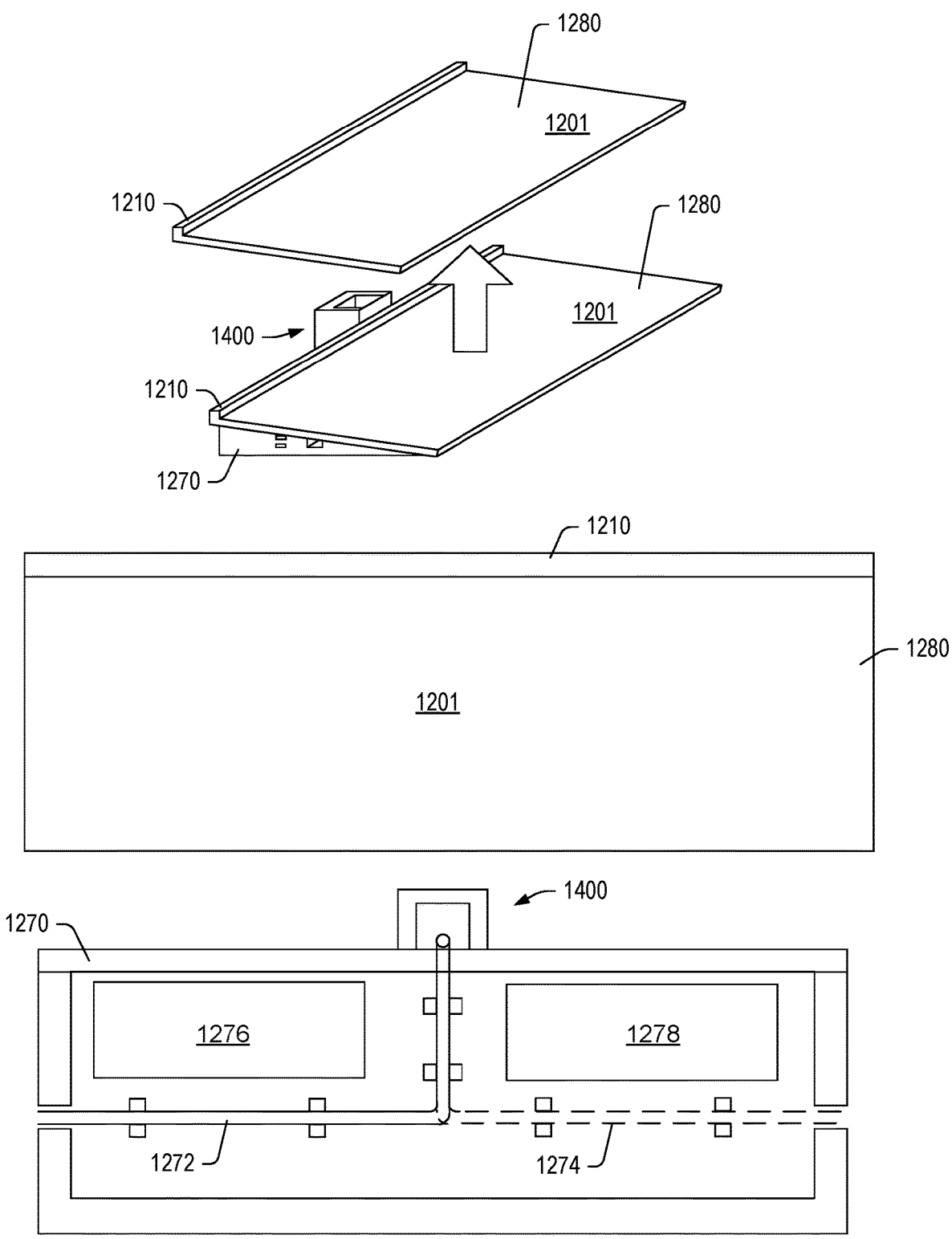
FIG. 11 is a perspective view and a plan view of an example of a display stand.

FIG. 11 shows a series of views an example of the display stand 1500 where the platform 1201 or a portion thereof is removable to access one or more features of the base 1200. For example, the base 1200 can include a frame 1270 and a cover 1280, which may include the raised feature 1210 or not. As shown, the frame 1270 can provide for routing the video cable 1350 via a left side passage or route 1272 (e.g., a left branch) or via a right side passage or route 1274 (e.g., a right branch). As an example, the frame 1270 can include one or more bays 1276 and 1278, which may provide for positioning of circuitry such as a converter, an adapter, etc.

As an example, wireless charging circuitry (e.g., Qi standard circuitry) may be disposed in one or both of the bays 1276 and 1278.

As an example, the base 1200 can include one or more magnets, which may facilitate positioning of one or more devices. For example, consider a stylus that can be positioned using a magnet where the stylus includes a magnet or a ferromagnetic material that can be attracted to a magnet of the base 1200. As an example, the raised feature 1210 can include a slot that may be utilized for positioning of a stylus (e.g., a pen, a pencil, a digitizer stylus, etc.).

As an example, the cover 1280 may include one or more light guides or other features that can emit and/or receive light. For example, consider a Li-Fi light guide that can provide for transmission of data using Li-Fi technology. Li-Fi technology is a derivative of optical wireless communications (OWC) technology that can use light from light-emitting diodes (LEDs) as a medium to deliver network, mobile, high-speed communication. As an example, a computing system can include Li-Fi technology that can operatively couple to Li-Fi technology of a display stand.

Figure 12:
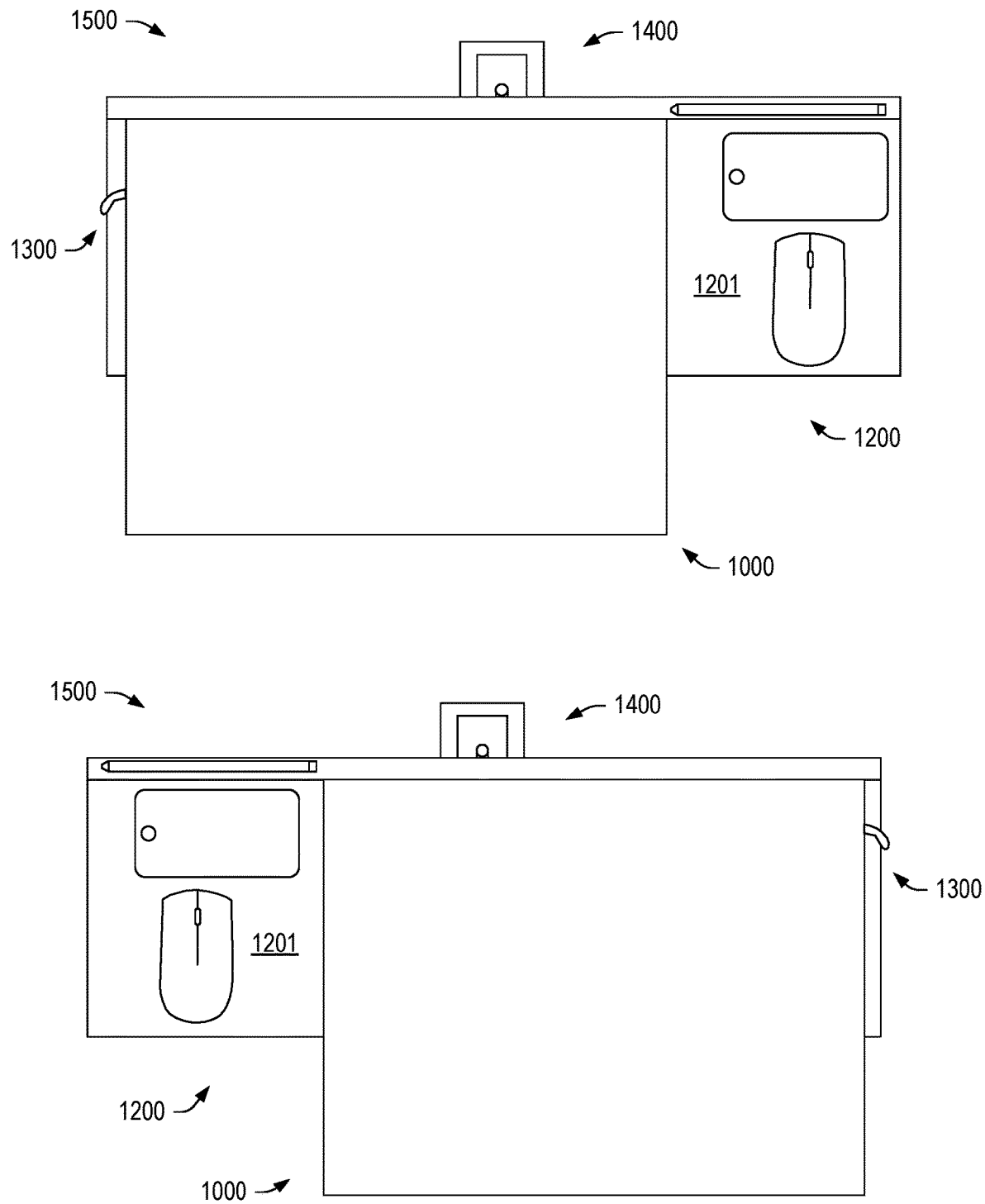
FIG. 12 is a series of plan views of an example of a system in two different orientations.

FIG. 12 shows plan views of two example orientations of the display stand 1500 where one of the orientations shows the computing system 1000 being positioned toward the left hand side of the platform 1201 and where the other one of the orientations shows the computing system 1000 being positioned toward the right hand side of the platform 1201. In the orientations shown, the platform 1201 can provide space for positioning of one or more devices such as, for example, a stylus, a cell phone, a mouse, etc. As mentioned, the base 1200 can include one or more types of circuitry, which may include wireless charging circuitry. As an example, consider a left hand side wireless charging antenna and a right hand side wireless charging antenna that allows for charging of one or more devices (e.g., recharging a rechargeable battery or batteries of a device). In such an example, the wireless charging circuitry can include a single base circuit or may include multiple base circuits.

As an example, a system can include a display that includes a mount; a display stand that includes a base that includes opposing sides and a platform that spans the opposing sides, an arm that extends from the base and that operatively couples to the mount, and a video cable passage that includes a side opening on one of the opposing sides of the base; and a video cable that operatively couples to the display, that is disposable at least in part in the video cable passage, and that includes a connector exposable via the side opening of the one of the opposing sides of the base of the display stand. In such an example, the connector can be or include a universal serial bus (USB) connector.

As an example, a base can include a connector recess on one of opposing sides that removably receives at least a portion of the connector. For example, consider a connector with a hammer head shape where one end of the hammer head shape can be received in a connector recess and where another opposing end of the hammer head shape is exposed and capable of being grasped by a human hand, for example, to be pinched and pulled to remove the connector fully from the connector recess. As an example, the connector or a portion thereof can be of a particular color, which may contrast with a color of the base such that a user's eyes are attracted to the connector. For example, where the base is black, the connector may be red such that a user can readily recognize that the connector is present or otherwise a feature that may be investigated further for some type of use. Where the user removes the connector from the recess, it may become apparent that the connector can be utilized to operatively couple a device or system of the user to the connector for transmission of at least video. For example, in the example of FIG. 3, at least a portion of the connector 320 can be colored to stand out from the base 200. As an example, the pigtail portion 360 may be colored in a color that contrasts with that of the side of the base 200. As the connector 320 includes a portion that extends outwardly from the side, it may be readily visible to a user, particularly where a user is seeking to connect a device or a system to the display 600. FIG. 2 shows the connector 320 as having a hammer head type of shape where one end can include a male connector that can be received by a female connector of the computing system 100 (e.g., consider USB-C type of male/female connectors).

As an example, a bottom of a base can define a plane where a platform of the base is disposed at an angle with respect to the plane. In such an example, the angle may be greater than 0 degrees and less than 20 degrees.

As an example, a system can include a base with opposing sides that include a left side and a right side with respect to a display surface of a display, where a video cable passage can include a left branch with a left side opening and a right branch with a right side opening. In such an example, a video cable can be adjustably disposable in the left branch for exposure via the left side opening and adjustably disposable in the right branch for exposure via the right side opening. As an example, a base can include a platform that is removable to expose at least a portion of the video cable passage. In such an example, the platform may be completely removable or may be hingedly removable to lift up while be coupled at a hinge end to expose one or more passages, bays, etc., of the base.

As an example, a base can include a wireless charger bay beneath a platform. In such an example, opposing sides of the base can include a left side and a right side with respect to a display surface of a display, where the wireless charger bay is closer to the right side than the left side. In such an example, the base can include a wireless charger disposed at least in part in the wireless charger bay. In such an example, the wireless charger bay may be a first wireless charger bay and the base may further include a second wireless charger bay. In such an example, the opposing sides of the base can be a left side and a right side with respect to a display surface of a display, where the first wireless charger bay is closer to the right side than the left side, and where the second wireless charger bay is closer to the left side than the right side.

As an example, a system may include a positionable wireless charger, positionable in one of a first wireless charger bay and a second wireless charger bay. As an example, a system may include a positionable wireless charger component such as a positionable antenna that can be positioned in a first bay or a second bay.

As an example, a platform can include a front edge and a back edge, where a distance between the front edge and the back edge is greater than 5 centimeters and less than 50 centimeters.

As an example, a platform can include a front edge and a back edge, where a distance between the front edge and the back edge is greater than 5 centimeters and less than 25 centimeters.

As an example, a system can include, in an operatively coupled state of a video cable to a display, where the video cable is disposed in a video cable passage, a connector that is exposed via a side opening of one of opposing sides of a base of a display stand and extendable from the one of the opposing side by a distance less than 15 centimeters. For example, a video cable can include or be operatively coupled to a pigtail that can be extended a distance from a side of a base where the distance is less than approximately 15 centimeters.

As shown in the example of FIG. 2, the pigtail portion 360 may be less than approximately 15 centimeters. For example, a length of a pigtail portion may be a fraction of a depth of a base. In the example of FIG. 2, the length of the pigtail portion 360 is approximately 50 percent or less of the depth $\Delta y_b$ of the base 200. As an example, a pigtail portion may be of a length that is less than approximately 50 percent of a depth of a base where the base includes a recess that has a dimension along the depth of the base that is also approximately less than approximately 50 percent of the depth of the base. As shown in FIG. 2, the connector 320, which can be a removable end (e.g., or a free end) can be stored proximate to the back edge 214 of the base 200 while another end may be a fixed end. As an example, a connector may be stored with a fixed end proximate to a back edge and a removable end (e.g., or free end) that is less proximate to the back edge. As an example, a pigtail portion can be a pluggable portion that includes a connector that plugs into a connector of a base while also including a connector that can connect to a port of a computing system. As an example, a pluggable portion that plugs into a connector of a base may utilize a securing connection, a snap connection, a screw, etc., such that a user does not remove the entire pigtail portion from the base (e.g., to take with him). As an example, a pigtail portion can include a removable end (e.g., or an extendible end) with a connector while also being fixed at another end to a base.

In the example of FIG. 2, the raised feature 410 is shown as being tubular shaped where the pigtail portion 360 is extended over the raised feature 410. In such an example, the curved or tubular shape of the raised feature 410 may provide for some amount of shaping of the pigtail portion 360 when connected to a computing system. For example, the curved shape may help to avoid sharp bends in the pigtail portion 360, which could expedite wear and possibly lead to a short or other failure. As shown, the raised feature 410 provides a radius that may be a bend radius for the pigtail portion 360 that is greater than a rated bend radius of the pigtail portion 360. In such an example, the raised feature may help to prevent a user from bending the pigtail portion 360 to a radius that is less than a rated bend radius of the pigtail portion 360. Various types of cables can be rated as to a minimum bend radius. For example, a 28 AWG HDMI cable may allow for a 2-inch bend radius (e.g., approximately 5 cm bend radius) while a 24 AWG may allow for a 3-inch bend radius (e.g., approximately 7.6 cm bend radius). As an example, a USB-C cable may be rated with a smaller bend radius than a 28 AWG or 24 AWG HDMI cable.

As an example, a USB-C cable may be a Newmex (Santa Clara, Calif.) flat USB 3.1 Type-C cable that can operate at a dynamic bending radius as low as 20 mm. As an example, a USB-C cable may include one or more features for durability. For example, consider one or more features of a DURATEK cable (Belkin International, Inc., Los Angeles, Calif.) that includes aramid fibers. Such fibers can be used as a reinforcing agent to strengthen the conductors and enhance protection. As an example, a cable may include one or more of shield-braid, metalized polymeric shielding, a thermoplastic elastomer jacket, a double-braided nylon exterior, etc.

As an example, a pigtail portion of a video cable may be a customized pigtail portion that includes a protective layer or layers and that may be designed for particular movements into and out of a recess.

As shown in the example of FIG. 2, a pigtail portion may be a flat type of cable where a recess may be shaped to accommodate at least a portion of a flat length of the pigtail portion. In such an example, the recess may be relatively shallow compared to its height. As an example, a pigtail portion may include a rubberized material that may be "grippy" to be readily grasped and to provide sufficient frictional force to retain the pigtail portion in a recess. As an example, a recess can include a coating that is made from a rubberized material that can be "grippy" to retain a pigtail portion within the recess when not in use. As an example, a material may be a thermoplastic rubber. As an example, a material may be a silicone rubber. As an example, a material may be an elastomer. As an example, a material of a pigtail portion can be an electrical insulator that can encase wires that are connected to a connector. As an example, a material of a recess may be an electrical insulator and may be utilized to surround at least an electrically conductive portion of a connector. For example, consider a "false" female connector that is formed by an electrically insulating material that can be a rubber (e.g., a natural rubber, a synthetic rubber, etc.).

As an example, a video cable may be physically coupled to another cable. For example, a video cable and another cable may include a common head that includes a connector and another connector (e.g., one for each cable).

As an example, a base can include at least one magnet. For example, consider at least one magnet that is a positionable magnet. In such an example, the magnet may be positioned and used to maintain an object, a device, etc., in a particular position such as on a platform where, for example, the platform may include a wireless charger. In such an example, the position may help to align one antenna with another antenna for wireless transfer of energy.

As an example, a base can include a light fidelity wireless communication component for communication of video data. For example, consider a light fidelity wireless communication component that is exposed via an upper surface of a platform of the base.

As an example, a system can include a laptop computer disposed at least in part on a platform, where the laptop computer includes a port. In such an example, the laptop computer can include a back edge and a front edge, where a platform includes a back edge and a front edge, where, in a coupled state of a connector extendable from the base being received in the port, the back edge of the laptop computer is disposed between the back edge and the front edge of the platform and the front edge of the laptop computer is not disposed between the back edge and the front edge of the platform.

As an example, a video cable passage may extend at least in part through an arm of a system where the arm supports a display.

As an example, a connector can include a stored orientation and an extended orientation where, in the stored orientation, a metallic electrical contact of the connector can be hidden and where, in the extended orientation, a metallic electrical contact of the connector is exposed. As explained, a recess may include an electrically insulator that can help to reduce risk of electrical contact with a connector when in a stored orientation.

As an example, a connector can be a male connector. In such an example, a base can include a female connector recess on one of opposing sides that, in a stored orientation of the male connector, seals an opening of the male connector.

As an example, a base can include wireless charging circuitry for charging at least one device selected from a group of a cellular phone, a smart watch, a mouse, a stylus, and a keyboard. In such an example, the at least one device can be positionable on a platform of the base for charging by the wireless charging circuitry. In such an example, the base may include magnetic material where at least one device includes magnetic material, where a magnetic attraction force between the magnetic materials exceeds a frictional force between the at least one device and the platform. In such an example, the magnetic attraction may help to prevent a device from sliding on a platform, which may be at an angle that is not horizontal.

The term "circuit" or "circuitry" is used in the summary, description, and/or claims. As is well known in the art, the term "circuitry" includes all levels of available integration (e.g., from discrete logic circuits to the highest level of circuit integration such as VLSI, and includes programmable logic components programmed to perform the functions of an embodiment as well as general-purpose or special-purpose processors programmed with instructions to perform those functions) that includes at least one physical component such as at least one piece of hardware. A processor can be circuitry. Memory can be circuitry. Circuitry may be processor-based, processor accessible, operatively coupled to a processor, etc. Circuitry may optionally rely on one or more computer-readable media that includes computer-executable instructions. As described herein, a computer-readable medium may be a storage device (e.g., a memory chip, a memory card, a storage disk, etc.) and referred to as a computer-readable storage medium, which is non-transitory and not a signal or a carrier wave.

Figure 13:
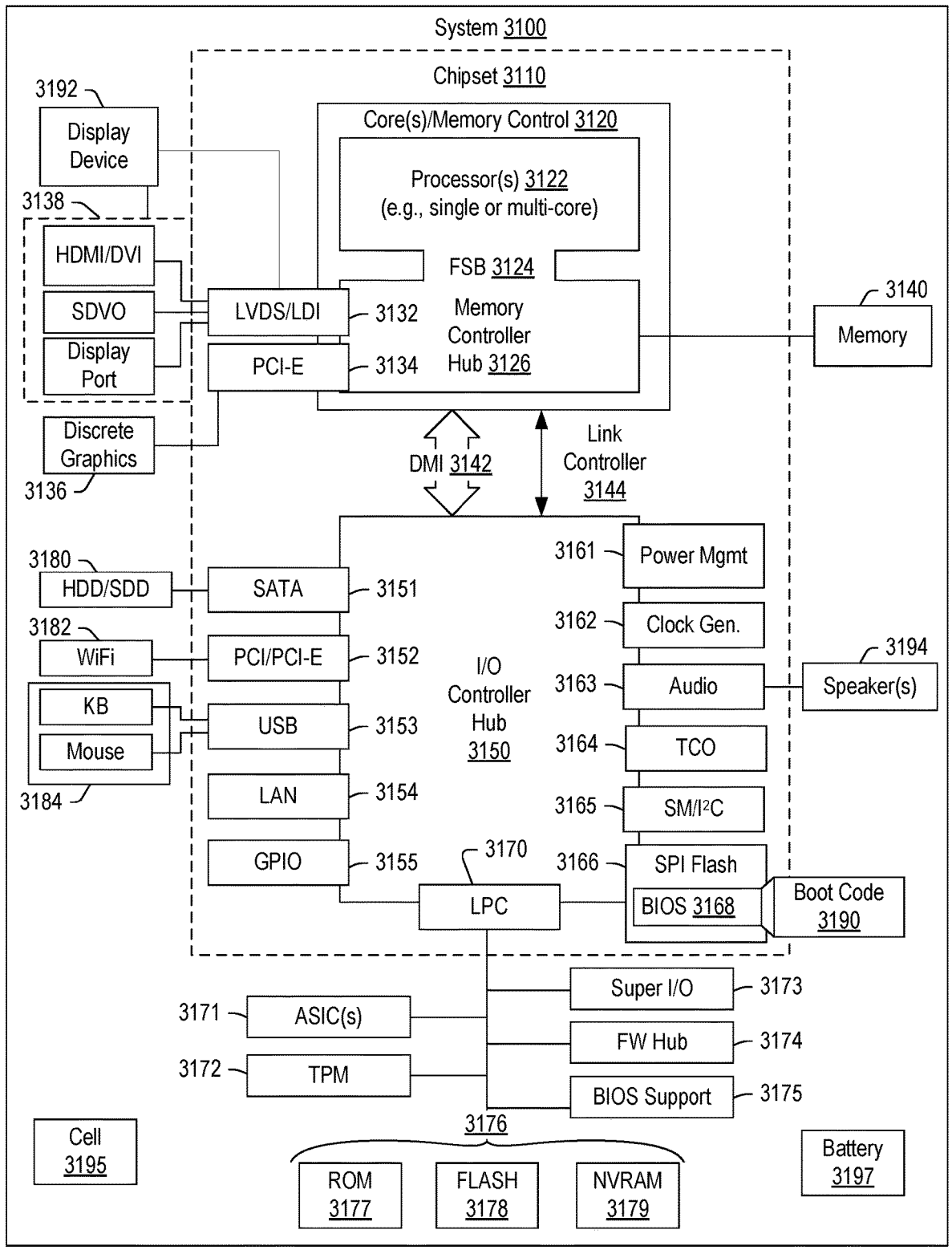
FIG. 13 is a diagram of an example of a system that includes one or more processors.

While various examples of circuits or circuitry have been discussed, FIG. 13 depicts a block diagram of an illustrative computer system 3100. The system 3100 may be a computer system, such as one of the ThinkCentre® or ThinkPad® series of personal computers sold by Lenovo (US) Inc. of Morrisville, N.C., or a workstation computer system, such as the ThinkStation®, which are sold by Lenovo (US) Inc. of Morrisville, N.C.; however, as apparent from the description herein, a system or other machine may include other features or only some of the features of the system 3100. As an example, a system such as the system 100 of FIG. 1 may include at least some of the features of the system 3100.

As shown in FIG. 13, the system 3100 includes a so-called chipset 3110. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 13, the chipset 3110 has a particular architecture, which may vary to some extent depending on brand or manufacturer. The architecture of the chipset 3110 includes a core and memory control group 3120 and an I/O controller hub 3150 that exchange information (e.g., data, signals, commands, etc.) via, for example, a direct management interface or direct media interface (DMI) 3142 or a link controller 3144. In the example of FIG. 13, the DMI 3142 is a chip-to-chip interface (sometimes referred to as being a link between a "northbridge" and a "southbridge").

The core and memory control group 3120 include one or more processors 3122 (e.g., single core or multi-core) and a memory controller hub 3126 that exchange information via a front side bus (FSB) 3124. As described herein, various components of the core and memory control group 3120 may be integrated onto a single processor die, for example, to make a chip that supplants the conventional "northbridge" style architecture.

The memory controller hub 3126 interfaces with memory 3140. For example, the memory controller hub 3126 may provide support for DDR SDRAM memory (e.g., DDR, DDR2, DDR3, etc.). In general, the memory 3140 is a type of random-access memory (RAM). It is often referred to as "system memory".

The memory controller hub 3126 further includes a low-voltage differential signaling interface (LVDS) 3132. The LVDS 3132 may be a so-called LVDS Display Interface (LDI) for support of a display device 3192 (e.g., a CRT, a flat panel, a projector, etc.). A block 3138 includes some examples of technologies that may be supported via the LVDS interface 3132 (e.g., serial digital video, HDMI/DVI, display port). The memory controller hub 3126 also includes one or more PCI-express interfaces (PCI-E) 3134, for example, for support of discrete graphics 3136. Discrete graphics using a PCI-E interface has become an alternative approach to an accelerated graphics port (AGP). For example, the memory controller hub 3126 may include a 16-lane (×16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 3150 includes a variety of interfaces. The example of FIG. 13 includes a SATA interface 3151, one or more PCI-E interfaces 3152 (optionally one or more legacy PCI interfaces), one or more USB interfaces 3153, a LAN interface 3154 (more generally a network interface), a general purpose I/O interface (GPIO) 3155, a low-pin count (LPC) interface 3170, a power management interface 3161, a clock generator interface 3162, an audio interface 3163 (e.g., for speakers 3194), a total cost of operation (TCO) interface 3164, a system management bus interface (e.g., a multi-master serial computer bus interface) 3165, and a serial peripheral flash memory/controller interface (SPI Flash) 3166, which, in the example of FIG. 13, includes BIOS 3168 and boot code 3190. With respect to network connections, the I/O hub controller 3150 may include integrated gigabit Ethernet controller lines multiplexed with a PCI-E interface port. Other network features may operate independent of a PCI-E interface.

The interfaces of the I/O hub controller 3150 provide for communication with various devices, networks, etc. For example, the SATA interface 3151 provides for reading, writing or reading and writing information on one or more drives 3180 such as HDDs, SDDs or a combination thereof. The I/O hub controller 3150 may also include an advanced host controller interface (AHCI) to support one or more drives 3180. The PCI-E interface 3152 allows for wireless connections 3182 to devices, networks, etc. The USB interface 3153 provides for input devices 3184 such as keyboards (KB), one or more optical sensors, mice and various other devices (e.g., microphones, cameras, phones, storage, media players, etc.). On or more other types of sensors may optionally rely on the USB interface 3153 or another interface (e.g., $I^2C$, etc.). As to microphones, the system 3100 of FIG. 13 may include hardware (e.g., audio card) appropriately configured for receipt of sound (e.g., user voice, ambient sound, etc.).

In the example of FIG. 13, the LPC interface 3170 provides for use of one or more ASICs 3171, a trusted platform module (TPM) 3172, a super I/O 3173, a firmware hub 3174, BIOS support 3175 as well as various types of memory 3176 such as ROM 3177, Flash 3178, and non-volatile RAM (NVRAM) 3179. With respect to the TPM 3172, this module may be in the form of a chip that can be used to authenticate software and hardware devices. For example, a TPM may be capable of performing platform authentication and may be used to verify that a system seeking access is the expected system.

The system 3100, upon power on, may be configured to execute boot code 3190 for the BIOS 3168, as stored within the SPI Flash 3166, and thereafter processes data under the control of one or more operating systems and application software (e.g., stored in system memory 3140). An operating system may be stored in any of a variety of locations and accessed, for example, according to instructions of the BIOS 3168. Again, as described herein, a satellite, a base, a server or other machine may include fewer or more features than shown in the system 3100 of FIG. 13. Further, the system 3100 of FIG. 13 is shown as optionally include cell phone circuitry 3195, which may include GSM, CDMA, etc., types of circuitry configured for coordinated operation with one or more of the other features of the system 3100. Also shown in FIG. 13 is battery circuitry 3197, which may provide one or more battery, power, etc., associated features (e.g., optionally to instruct one or more other components of the system 3100). As an example, a SMBus may be operable via a LPC (see, e.g., the LPC interface 3170), via an I²C interface (see, e.g., the SM/I²C interface 3165), etc.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A system comprising:
a flat panel display that comprises a mount;
a display stand that comprises a base that comprises opposing sides and a mobile computing device platform that spans the opposing sides, an arm that extends from the mobile computing device platform of the base and that operatively couples to the mount to elevate the flat panel display to define a clearance between the flat panel display and the mobile computing device platform, and a video cable passage that comprises a side opening on one of the opposing sides of the base; and
a video cable that runs through the arm and electronically couples to the flat panel display, that is disposable at least in part in the video cable passage, and that comprises a connector exposable via the side opening of the one of the opposing sides of the base of the display stand, wherein the video cable comprises a pigtail portion that comprises the connector and wherein the base comprises a pigtail recess on the one of the opposing sides that removably receives the pigtail portion for storage and deployment of the pigtail portion at least in part over the mobile computing device platform;
wherein the connector is configured to connect to a port of a mobile computing device positioned on the mobile computing device platform.

2. The system of claim 1, wherein the connector comprises a universal serial bus (USB) connector.

3. The system of claim 1, wherein a bottom of the base defines a plane and wherein the platform is disposed at an angle with respect to the plane.

4. The system of claim 3, wherein the angle is greater than 0 degrees and less than 20 degrees.

5. The system of claim 1, wherein the opposing sides comprise a left side and a right side with respect to a display surface of the display, wherein the video cable passage comprises a left branch with a left side opening and a right branch with a right side opening.

6. The system of claim 5, wherein the video cable is adjustably disposable in the left branch for exposure via the left side opening and is adjustably disposable in the right branch for exposure via the right side opening.

7. The system of claim 5, wherein the platform is removable to expose at least a portion of the video cable passage.

8. The system of claim 1, wherein the base comprises a wireless charger bay beneath the platform.

9. The system of claim 1, wherein, in an operatively coupled state of the video cable to the display, wherein the video cable is disposed in the video cable passage, the connector is exposed via the side opening of the one of the opposing sides of the base of the display stand and extendable from the one of the opposing side by a distance less than 15 centimeters.

10. The system of claim 1, wherein the video cable is physically coupled to another cable.

11. The system of claim 10, wherein the video cable and the other cable comprise a common head that comprises the connector and another connector.

12. The system of claim 1, wherein the base comprises wireless charging circuitry and at least one magnet for generating an attractive force for positioning an object on the platform with respect to the wireless charging circuitry.

13. The system of claim 1, wherein the video cable passage extends at least in part through the arm.

14. The system of claim 1, wherein the connector comprises a stored orientation and an extended, deployed orientation.

15. The system of claim 14, wherein, in the stored orientation, a metallic electrical contact of the connector is hidden and wherein, in the extended, deployed orientation, a metallic electrical contact of the connector is exposed.

16. The system of claim 1, wherein the pigtail portion comprises a grip that facilitates manual extraction of the pigtail portion from the pigtail recess.

17. The system of claim 16, wherein the connector is at one end of the pigtail portion, wherein the connector comprises a reversible orientation universal serial bus (USB) connector, and wherein another end of the pigtail portion is fixed to the display stand.

* * * * *